US012778003B2

(12) United States Patent
Min

(10) Patent No.: US 12,778,003 B2
(45) Date of Patent: Nov. 3, 2026

(54) TRIMMER HEAD

(71) Applicant: Greenworks (Jiangsu) Co., Ltd, Changzhou (CN)

(72) Inventor: Guoqing Min, Changzhou (CN)

(73) Assignee: Greenworks (Jiangsu) Co., Ltd, Changzhou (CN)

( * ) Notice: Subject to any disclaimer, the term of this patent is extended or adjusted under 35 U.S.C. 154(b) by 98 days.

(21) Appl. No.: 18/894,124

(22) Filed: Sep. 24, 2024

(65) Prior Publication Data

US 2025/0120339 A1 Apr. 17, 2025

(30) Foreign Application Priority Data

Oct. 12, 2023 (CN) ........................ 202322751269.0

(51) Int. Cl.
*A01D 34/416* (2006.01)

(52) U.S. Cl.
CPC ..... *A01D 34/4165* (2013.01); *A01D 34/4163* (2013.01)

(58) Field of Classification Search
None
See application file for complete search history.

(56) References Cited

U.S. PATENT DOCUMENTS 2,708,820 A * 5/1955 Britten III .............. A01D 34/90 56/13.7
3,826,068 A * 7/1974 Ballas .................. A01D 34/416 56/295
4,097,991 A * 7/1978 Proulx ................. A01D 34/416 30/276
5,806,192 A * 9/1998 Everts ................ A01D 34/4163 30/276
6,901,667 B2 * 6/2005 Proulx ............... A01D 34/4163 30/276
8,464,431 B2 * 6/2013 Reynolds ........... A01D 34/4163 30/276
9,883,628 B2 * 2/2018 Morabit ............. A01D 34/4165
2023/0000008 A1 * 1/2023 Cholst ................ A01D 34/4167
2025/0120339 A1 * 4/2025 Min ..................... A01D 34/416

FOREIGN PATENT DOCUMENTS

CN 111972114 A * 11/2020 ........... A01D 34/416
GB 2619710 A * 12/2023 ............ F16B 37/044

OTHER PUBLICATIONS

English translation of CN-111972114-A, dated Nov. 24, 2020.*

* cited by examiner

*Primary Examiner* — Hwei-Siu C Payer

(57) ABSTRACT

A trimmer head is configured to be connected with a driving shaft of a driving component. The trimmer head includes a base and a bump head assembled and connected with the base. The trimmer head further includes a locking insert assembled and fixed in the base and the bump head. A first end of the locking insert extends into the bump head, and a second end of the locking insert passes through the base to be connected with the driving shaft. The locking insert includes a main body and a nylon sleeve press-fitted and mounted inside the main body. The nylon sleeve is fixed relative to the main body. The driving shaft is screwed into the nylon sleeve from one end of the main body to connect the driving shaft and the trimmer head through the nylon sleeve.

10 Claims, 5 Drawing Sheets

TRIMMER HEAD

CROSS REFERENCE TO RELATED APPLICATION

The present application claims the priority of the following Chinese patent applications: serial No. CN202322751269.0, filed on Oct. 12, 2023; the disclosure of which is hereby incorporated by reference herein in its entirety for all purposes.

TECHNICAL FIELD

The disclosure relates to a trimmer head and belongs to a field of garden tools.

BACKGROUND

As a garden tool, a string trimmer is usually used to mow a lawn.

Traditional string trimmers will have tangled lawns after working for a period of time. Currently, there are string trimmers on the market with a reversing function to remove the tangled lawns, but the trimmer head may fall off, and the bump head needs to be disassembled when replacing the trimmer head. Tools must be used to disassemble the bump head and replace the trimmer head, which consumes time and effort and affects the user's experience.

In view of this, it is necessary to improve the conventional trimmer head to solve the problems mentioned above.

SUMMARY

One or more embodiments of the disclosure provide a trimmer head, which can quickly remove entangled lawns through a reversing function and can also achieve a quick replacement of the trimmer head at the same time.

One or more embodiments of the disclosure provide the trimmer head, for connection with a driving shaft of a driving component. The trimmer head includes a base, a bump head connected with the base, and a locking insert fixed in the base and the bump head. A first end of the locking insert extends into the bump head, and a second end of the locking insert passes through the base to be connected to the driving shaft. The locking insert includes a main body and a nylon sleeve press-fitted inside the main body. The nylon sleeve is fixed relative to the main body. The driving shaft is screwed into the nylon sleeve from one end of the main body to connect the driving shaft and the trimmer head through the nylon sleeve.

In an embodiment of the disclosure, the main body is cylindrical shaped, a positioning component protruding outward is arranged on an outer wall of the main body, a fixing groove is arranged in the base, and the positioning component is accommodated in the fixing groove to positionally connect the main body to the base.

In an embodiment of the disclosure, the main body is a hollow annular structure, a threaded structure is arranged on an inner peripheral wall of the main body, and the driving shaft is inserted into the main body and matched with the threaded structure to be screwed in.

In an embodiment of the disclosure, the nylon sleeve is also a hollow annular shape, and a mounting cavity is defined in the main body, the mounting cavity is located at one side of the threaded structure, the nylon sleeve is fixed in the mounting cavity, and the driving shaft is screwed into the nylon sleeve through the threaded structure.

In an embodiment of the disclosure, in a screwing direction of the driving shaft, the threaded structure is arranged at a middle position of the main body, the positioning component is located above the threaded structure and close to the base, and the mounting cavity is located below the threaded structure and close to the bump head.

In an embodiment of the disclosure, an inner diameter of the mounting cavity is larger than an inner diameter of a thread of the threaded structure, and the nylon sleeve is arranged to fit an inner wall surface of the mounting cavity.

In an embodiment of the disclosure, a fixing post is arranged at a center of the bump head, a first end of the main body extends into the fixing post and is fixedly connected with the fixing post, a mounting opening is arranged on a side of the base away from the bump head, and a second end of the main body passes through the mounting opening to be connected with the driving shaft.

In an embodiment of the disclosure, the nylon sleeve is fixed to the first end of the main body extending into the fixing post.

In an embodiment of the disclosure, the trimmer head further includes a bump spring, a first end of the bump spring is fixed in the base, and a second end of the bump spring is sleeved on an outside of the fixing post, so as to enable the bump head to move axially relative to the base to release a string when the bump head is bumped.

In an embodiment of the disclosure, the trimmer head further includes a spool and a connecting component, the spool is arranged around an outside of the locking insert and is fixedly connected with the bump head, and the connecting component is arranged on an outside of the spool and is fixedly connected with the base.

Beneficial effects of one or more embodiments of the disclosure are that the trimmer head realizes a fixed connection between the trimmer head and the driving shaft by assembling the locking insert in the base and the bump head, the first end of the locking insert extending into the bump head and the second end of the locking insert penetrating the base and being connected with the driving shaft. In addition, the nylon sleeve is press-fitted and mounted into the main body, so that the driving shaft may be extended into the nylon sleeve to realize a tight connection between the driving shaft and the trimmer head. Compared with the prior art, the trimmer head of the disclosure solves a problem of time-consuming and labor-intensive when removing tangled lawns and avoids the trimmer head from falling when it is reversed to remove the tangled lawns. And the trimmer head can be quickly replaced at the same time, thereby improving user's experience.

DETAILED DESCRIPTION

In order to enable the purpose, technical solutions and advantages of the disclosure to be clearer, the disclosure is described in detail below with reference to the accompanying drawings and specific embodiments.

Figure 1:
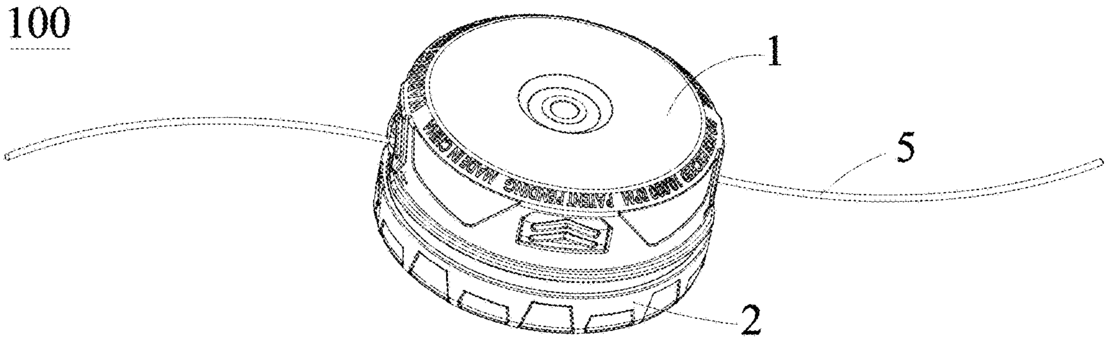
FIG. 1 is a perspective schematic structural view of a trimmer head according to an embodiment of the disclosure.
Figure 2:
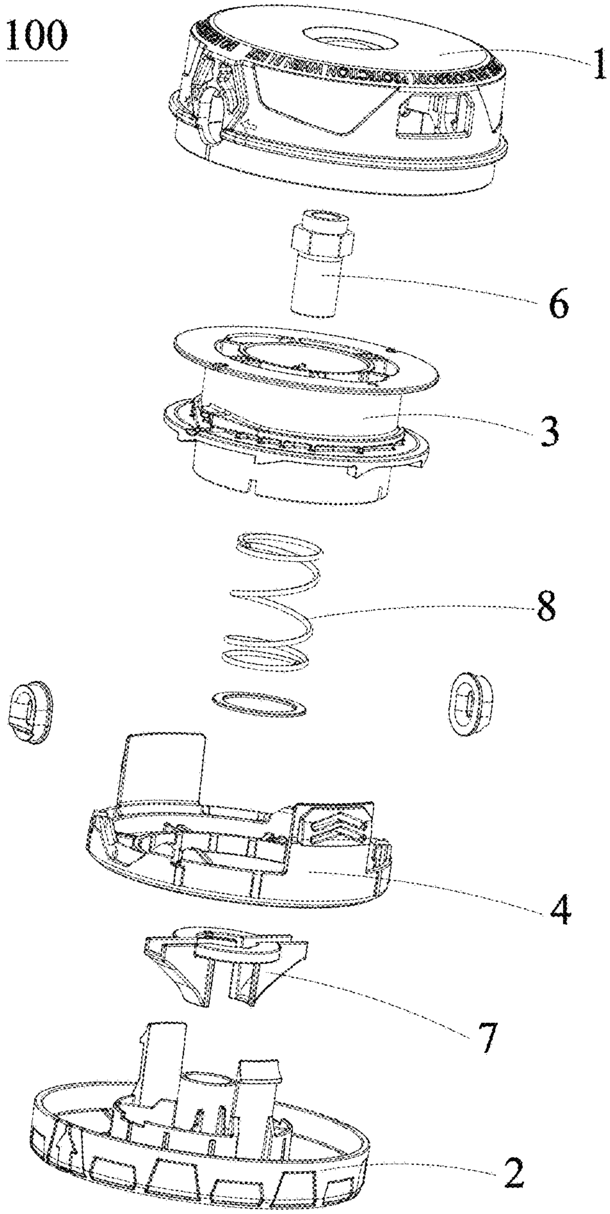
FIG. 2 is an exploded view of the trimmer head in FIG. 1.
Figure 3:
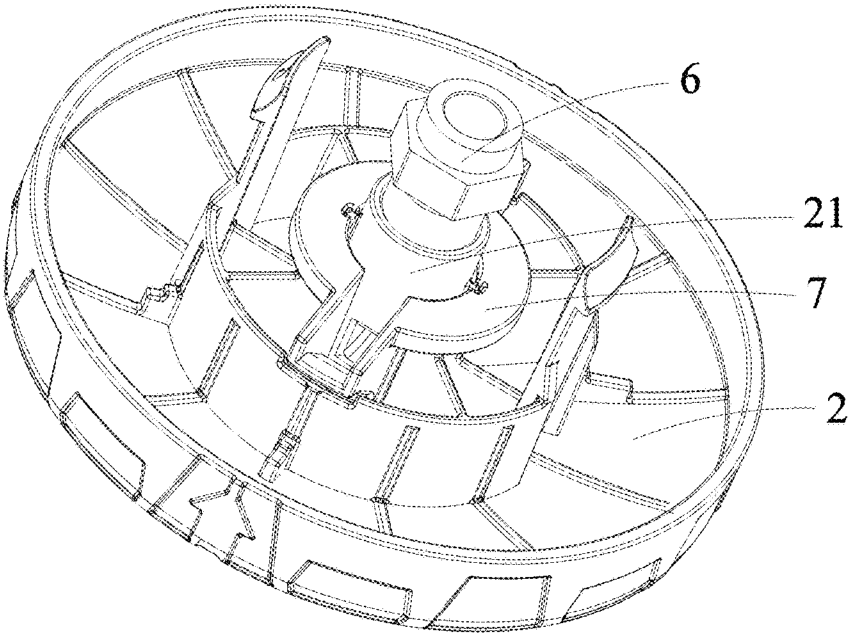
FIG. 3 is an assembling view of a locking insert and a bump head in FIG. 1.
Figure 4:
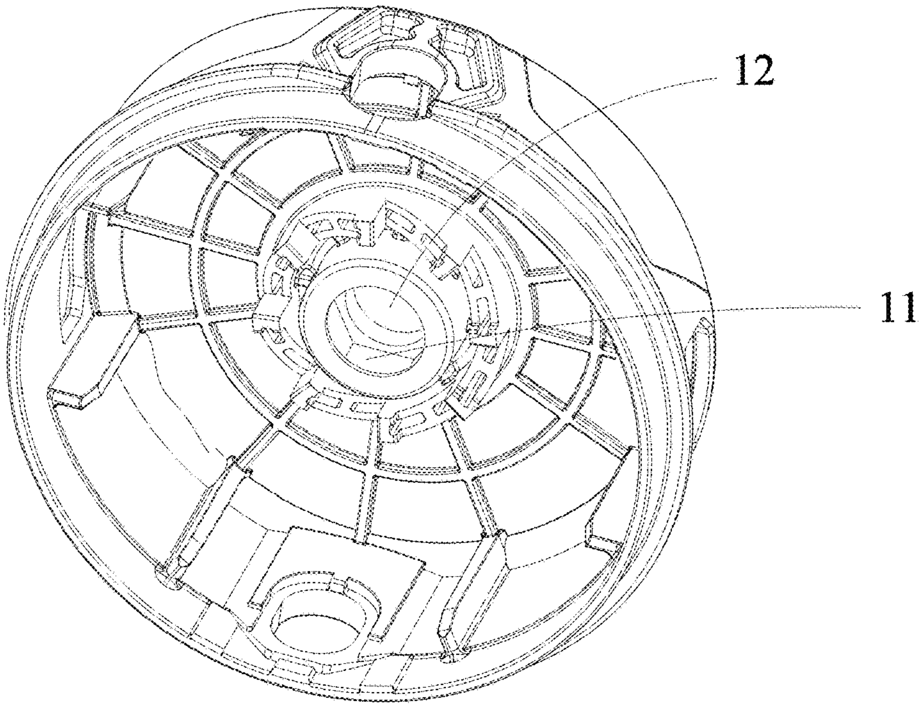
FIG. 4 is a perspective schematic structural view of a base in FIG. 2.
Figure 5:
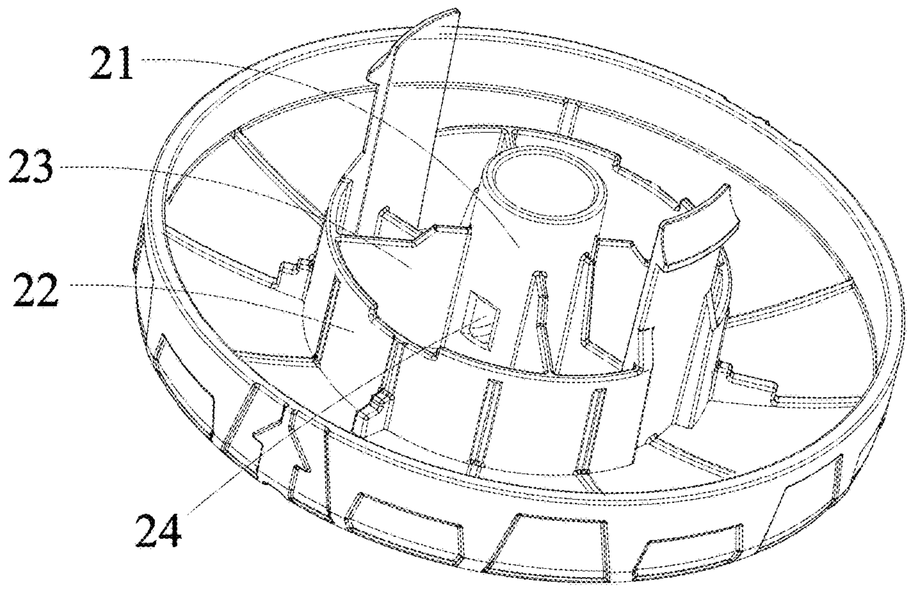
FIG. 5 is a perspective schematic structural view of the bump head in FIG. 2.
Figure 6:
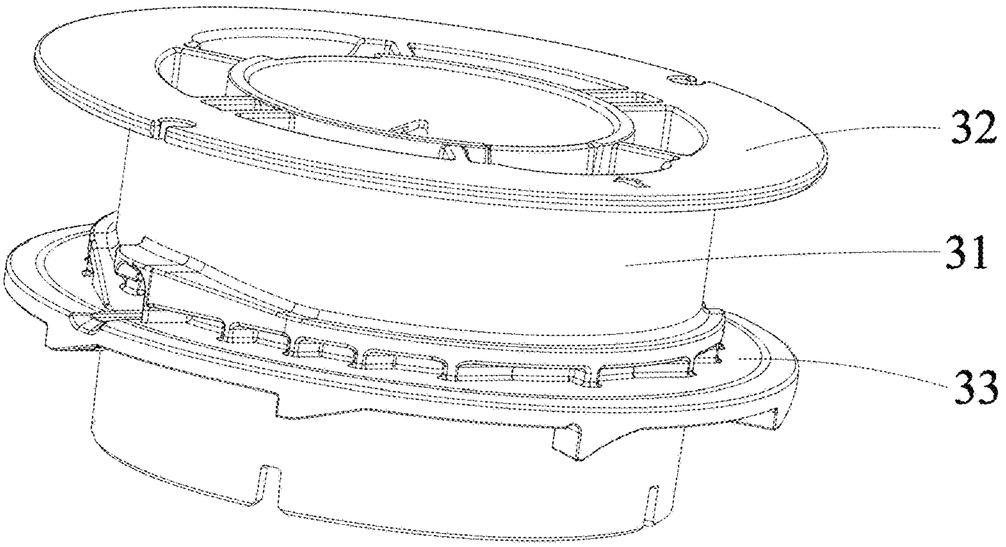
FIG. 6 is a perspective schematic structural view of a spool in FIG. 2.

Please refer to FIG. 1 and FIG. 2, an exemplary embodiment of a trimmer head 100 for connection with a driving shaft (not shown in the figure) of a driving component is shown, and the driving component may be a gear box or a motor, which is not limited here.

The trimmer head 100 includes a base 1, a bump head 2 connected with the base 1, a spool 3 and a connecting component 4. The spool 3 and connecting component 4 are assembled inside the base 1 and the bump head 2. The spool 3 is wound with a trimmer line 5. The trimmer head 100 further includes a locking insert 6 assembled and fixed in the base 1 and the bump head 2. A first end of the locking insert 6 extends into the bump head 2, and a second end of the locking insert 6 penetrates through the base 1 to be connected with the driving shaft. The locking insert 6 locks the driving shaft. After the string trimmer has been working for a period of time, lawns will be tangled on the trimmer head 100. A reversing function of the trimmer head 100 can quickly remove the tangled lawns. When the trimmer head 100 is reversed, due to a locking effect of the locking insert 6, the trimmer head 100 will not fall off when shaking off tangled lawn clippings, thereby solving a problem of time-consuming and labor-intensive when removing the tangled lawns and providing greater safety for users at the same time.

Please refer to FIG. 3 through FIG. 6. The base 1 is provided with a fixing groove 11. The locking insert 6 is housed in the fixing groove 11, and a mounting opening 12 is arranged on a side of the base 1 away from the bump head 2. The locking insert 6 passes through the mounting opening 12 to be connected with the driving shaft. A fixing post 21 is arranged at a center of the bump head 2. One end of the locking insert 6 extends into the fixing post 21 and is fixedly connected with the fixing post 21. An annular fixing rim 22 is arranged around the fixing post 21. A plurality of protruding ribs 23 is arranged between the fixing rim 22 and the fixing post 21, and an opening groove 24 penetrating transversely is arranged at one end of the fixing post 21 close to the bump head 2. The trimmer head 100 is further provided with a wire groove 7, and the wire groove 7 is cooperatively connected with the protruding ribs 23 so that the wire groove 7 is aligned with the opening groove 24.

Furthermore, the spool 3 is arranged on an outer side of the fixing rim 22 and is fixedly connected with the bump head 2. One end of the spool 3 close to the base 1 is arranged around an outer side of the locking insert 6. The spool 3 is provided with a line winding space 31, a first connecting plate 32 and a second connecting plate 33. The first connecting plate 32 and the second connecting plate 33 are located at two ends of the line winding space 31 and are arranged parallel to each other. The first connecting plate 32 is cooperatively connected with the base 1. A connecting component 4 is arranged around an outer side of the spool 3, and the connecting component 4 is fixedly connected with the base 1. A compression space is arranged between the connecting component 4 and the bump head 2. The trimmer head 100 further includes a bump spring 8. A first end of the bump spring 8 is fixed in the base 1, and a second end of the bump spring 8 is sleeved on an outside of the fixing post 21, so as to enable the bump head 2 to be capable of moving axially relative to the base in the compression space to release a string when the bump head 2 is bumped.

Figure 7:
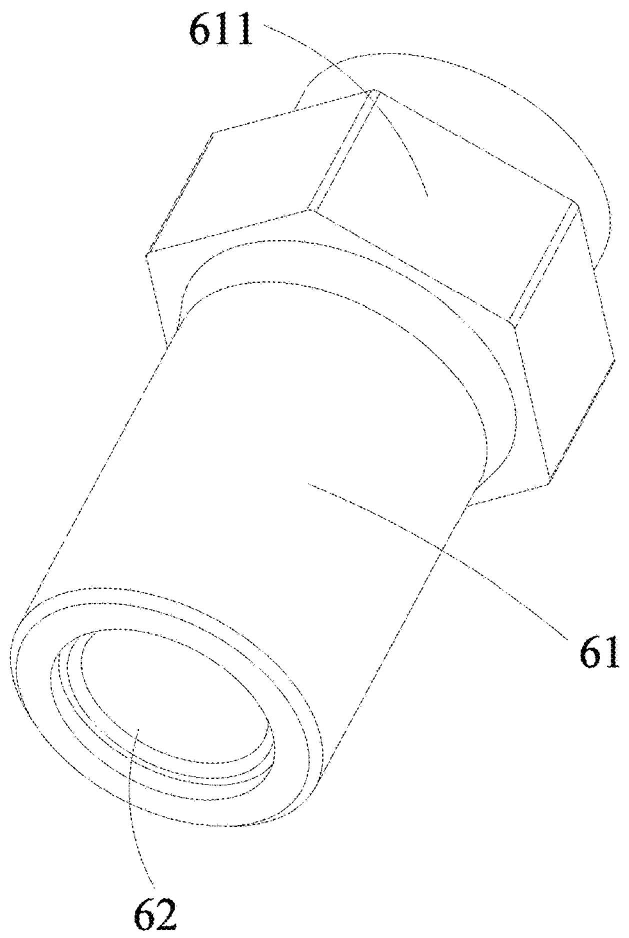
FIG. 7 is a perspective schematic structural view of the locking insert in FIG. 2.
Figure 8:
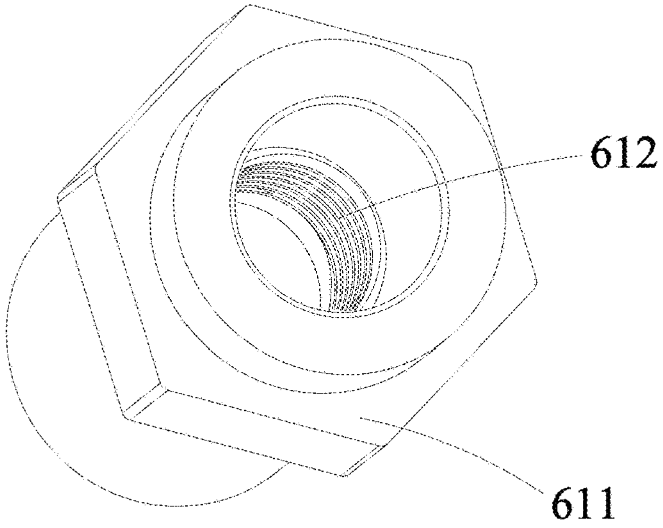
FIG. 8 is a perspective schematic structural view of the locking insert in FIG. 2 from another angle.
Figure 9:
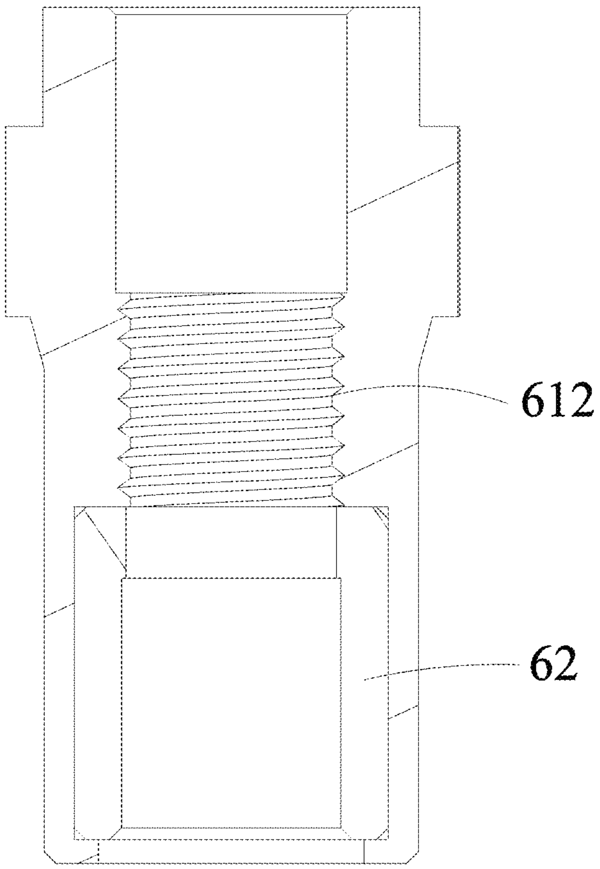
FIG. 9 is a cross-sectional view of the locking insert in FIG. 2.

Please refer to FIG. 7 through FIG. 9. The locking insert 6 includes a main body 61 and a nylon sleeve 62 press-fitted and mounted inside the main body 61. The nylon sleeve 62 is fixed relative to the main body 61. The nylon sleeve 62 is wear-resistant, which improves a quality of the locking insert 6 and prolongs a duration life of the locking insert 6. The driving shaft is screwed into one end of the main body 61 and extends into the nylon sleeve 62, so that the driving shaft and the trimmer head 100 are connected through the nylon sleeve 62. Therefore, when the driving shaft drives the trimmer head 100 to reverse, the trimmer head 100 will not fall off the driving shaft because the nylon sleeve 62 locks the driving shaft. In other words, when the trimmer head 100 reverses, the trimmer head 100 and the driving shaft will not rotate relative to each other.

In an embodiment, a first end of the main body 61 extends into the fixing post 21 and is fixedly connected with the fixing post 21, and a second end of the main body 61 passes through the mounting opening 12 to be connected with the driving shaft. The nylon sleeve 62 is fixed to the first end of the main body 61 extending into the fixing post 21. The main body 61 is cylindrical shaped. A positioning component 611 protruding outward from an outer wall of the main body 61 is arranged on the outer wall of the main body 61. The positioning component 611 is accommodated in the fixing groove 11 to positionally connect the main body 61 to the base 1. In an embodiment, the positioning component 611 is nut-shaped, and a housing space of the fixing groove 11 is also nut-shaped, so that the locking insert 6 and the base 1 do not rotate relative to each other. A shape of the positioning component 611 and a shape of the housing space of the fixing groove 11 are not limited here.

The main body 61 is a hollow annular structure. A threaded structure 612 is arranged on an inner peripheral wall of the main body, and the driving shaft is inserted into the main body 61 and matched with the threaded structure 612 to be screwed in. The nylon sleeve 62 is also a hollow annular shape, and a mounting cavity (not labeled) is arranged in the main body 61. The mounting cavity is located at one side of the threaded structure 612, the nylon sleeve 62 is fixed in the mounting cavity, and the driving shaft is screwed into the nylon sleeve 62 through the threaded structure 612. When the driving shaft is screwed in, the nylon sleeve 62 will not rotate with the driving shaft, nor will it be pushed out by the driving shaft. In a screwing direction of the driving shaft, the threaded structure 612 is arranged at a middle position of the main body 61, the positioning component 611 is located above the threaded structure 612 and close to the base 1, and the mounting cavity is located below the threaded structure 612 and close to the bump head 2. The threaded structure 612 enables it to be easier to screw the driving shaft into or out of the nylon sleeve 62 with less effort.

An inner diameter of the mounting cavity is larger than an inner diameter of a thread of the threaded structure 612. The nylon sleeve 62 is arranged to fit an inner wall surface of the mounting cavity. An inner diameter of the nylon sleeve 62 is slightly larger than the inner diameter of the thread of the threaded structure 612, so that when the driving shaft is screwed into the locking insert 6, the nylon sleeve 62 will not be too tight or too loose to be connected with the driving shaft. When the trimmer head 100 is worn, the trimmer head 100 can be directly and quickly rotated to be removed for replacement while the driving shaft is fixed, which is without a need to disassemble the bump head 2 and use tools to replace the trimmer head 100.

In summary, the trimmer head 100 is assembled and fixed with the locking insert 6 in the base 1 and the bump head 2, the first end of the locking insert 6 extends into the striking head 2, and the second end of the locking insert 6 passes through the base 1 and is connected with the driving shaft, so as to connect the driving shaft with the trimmer head 100. In addition, the trimmer head 100 is further configured by arranging the locking insert 6 to include the main body 61 and the nylon sleeve 62 press-fitted inside the main body 61, and the nylon sleeve 62 is fixedly arranged relative to the main body 61, so that when the driving shaft is screwed into one end of the main body 61 and extends into the nylon sleeve 62, the driving shaft and the trimmer head 100 may be tightly connected through the nylon sleeve 62. Compared with the prior art, the trimmer head 100 of the disclosure solves a problem of time-consuming and labor-intensive when removing tangled lawns and avoids the trimmer head 100 from falling when it is reversed to remove the tangled lawns. And the trimmer head 100 can be quickly replaced at the same time, thereby improving user's experience.

The above embodiments are only used to illustrate technical features of the disclosure rather than to limit it. Although the disclosure is described in detail with reference to the preferred embodiments, ordinary technicians in a field should understand that the technical features of the disclosure may be modified or replaced by equivalents without departing from a spirit and scope of the technical features of the disclosure.

What is claimed is:

1. A trimmer head, for connection to a driving shaft of a driving component, the trimmer head comprising:

a base, a bump head connected with the base, and a locking insert fixed in the base and the bump head, a first end of the locking insert extending into the bump head, a second end of the locking insert passing through the base to be connected to the driving shaft, the locking insert comprising a main body and a nylon sleeve press-fitted inside the main body, the nylon sleeve fixed relative to the main body, and the driving shaft screwed into the nylon sleeve from a first end of the main body to connect the driving shaft and the trimmer head through the nylon sleeve.

2. The trimmer head according to claim 1, wherein, the main body is cylindrical shaped, a positioning component protruding outward is arranged on an outer wall of the main body, a fixing groove is arranged in the base, and the positioning component is accommodated in the fixing groove to positionally connect the main body to the base.

3. The trimmer head according to claim 2, wherein, the main body is a hollow annular structure, a threaded structure is arranged on an inner peripheral wall of the main body, and the driving shaft is inserted into the main body and matched with the threaded structure to be screwed in.

4. The trimmer head according to claim 3, wherein, the nylon sleeve is a hollow annular shape, and a mounting cavity is defined in the main body, the mounting cavity is located at one side of the threaded structure, the nylon sleeve is fixed in the mounting cavity, and the driving shaft is screwed into the nylon sleeve through the threaded structure.

5. The trimmer head according to claim 4, wherein, in a screwing direction of the driving shaft, the threaded structure is arranged at a middle position of the main body, the positioning component is located above the threaded structure and close to the base, and the mounting cavity is located below the threaded structure and close to the bump head.

6. The trimmer head according to claim 4, wherein, an inner diameter of the mounting cavity is larger than an inner diameter of a thread of the threaded structure, and the nylon sleeve is arranged to fit an inner wall surface of the mounting cavity.

7. The trimmer head according to claim 1, wherein, a fixing post is arranged at a center of the bump head, a second end of the main body extends into the fixing post and is fixedly connected with the fixing post, a mounting opening is arranged on a side of the base away from the bump head, and the first end of the main body passes through the mounting opening to be connected with the driving shaft.

8. The trimmer head according to claim 7, wherein, the nylon sleeve is fixed to the second end of the main body extending into the fixing post.

9. The trimmer head according to claim 7, further comprising a bump spring, wherein, a first end of the bump spring is fixed in the base, and a second end of the bump spring is sleeved on an outside of the fixing post, so as to enable the bump head to move axially relative to the base to release a string when the bump head is bumped.

10. The trimmer head according to claim 1, further comprising a spool and a connecting component, wherein, the spool is arranged around an outside of the locking insert and is fixedly connected with the bump head, and the connecting component is arranged on an outside of the spool and is fixedly connected with the base.

* * * * *